United States Patent [19]

Maeda

[11] Patent Number: 4,723,304
[45] Date of Patent: Feb. 2, 1988

[54] MOBILE STATION AND A MOBILE RADIO COMMUNICATION NETWORK IN WHICH ELECTRIC POWER IS SAVED WITHOUT REDUCTION OF AN ACTIVITY RATIO OF RADIO COMMUNICATION CHANNELS

[75] Inventor: Koji Maeda, Toyko, Japan
[73] Assignee: NEC Corporation, Tokyo, Japan
[21] Appl. No.: 19,986
[22] Filed: Feb. 27, 1987
[30] Foreign Application Priority Data
  Feb. 27, 1986 [JP] Japan .................. 61-42434
[51] Int. Cl.$^4$ .................................. H01B 7/00
[52] U.S. Cl. ................................ 455/69; 455/89; 455/127; 379/56; 379/63
[58] Field of Search ............... 379/57, 58, 63; 455/69, 455/89, 127; 370/18, 95

[56] References Cited

U.S. PATENT DOCUMENTS

| | | | |
|---|---|---|---|
| 4,512,033 | 4/1985 | Schrock | 455/2 |
| 4,554,532 | 11/1985 | Ise et al. | 340/501 |
| 4,580,262 | 4/1986 | Waylor et al. | 371/5 |
| 4,613,990 | 9/1986 | Halpern | 455/33 |
| 4,631,736 | 12/1986 | Yamanone et al. | 375/71 |
| 4,652,875 | 3/1987 | Waki | 340/825.44 |
| 4,673,861 | 6/1987 | Dubovsky et al. | 320/2 |

Primary Examiner—Robert Lev
Attorney, Agent, or Firm—Sughrue, Mion, Zinn, Macpeak & Seas

[57] ABSTRACT

For a transmitter of a mobile station of a radio communication network which is typically a mobile radio telephone network, a power supplying arrangement is intermittently energized before being continually energized to allow the transmitter deliver a speech signal to another mobile station through a base station of the network. More particularly, the power supplying arrangement is temporarily energized in response to a down-loop indicating signal, and transmits a specific up-loop signal after which it is deenergized immediately subsequent to transmission from the transmitter of a known pre-call response signal. After this operation, it is preferable that the power supplying arrangement is intermittently energized upon reception of an intermittent succession of call signals and then continuously energized after the mobile station is put into an off-hook state for transmission of the speech signal.

4 Claims, 3 Drawing Figures

MOBILE STATION AND A MOBILE RADIO COMMUNICATION NETWORK IN WHICH ELECTRIC POWER IS SAVED WITHOUT REDUCTION OF AN ACTIVITY RATIO OF RADIO COMMUNICATION CHANNELS

BACKGROUND OF THE INVENTION

This invention relates to a mobile station and a mobile radio communication network, such as a mobile telephone system.

A conventional mobile telephone system comprises a base station and a plurality of mobile stations. The base station is situated at a fixed location and has a service area. Each mobile station is installed in an automobile or a like vehicle. The mobile station is for use by a subscriber or user who is driving the automobile in the service area.

The base station is for transmitting a radio frequency communication signal towards one of the mobile stations that is selected as a selected station. The communication signal comprises a down-loop indicating signal and, an intermittent succession of call signals. The down-loop indicating signal is for specifying the selected station. The call signal succession is for making the selected station notify the subscriber of a call from the base station.

Each mobile station includes a transmitter, a receiver, and a power supplying circuit. The transmitter and the receiver are for transmitting and receiving communication signals between the base station and the mobile station. The power supplying circuit is for supplying electric power from a battery to each of the receiver and the transmitter.

When the down-loop indicating signal is monitored by the receiver, a down-loop check signal is produced in the selected station. In response to the down-loop check signal, the transmitter is supplied with the electric power to transmit a specific up-loop signal towards the base station. Thus, the base station is operatively coupled to the selected station through a selected one of radio communication channels.

In a conventional mobile station, the transmitter is continuously supplied with the electric power after transmission of the specific up-loop signal even if it is unnecessary to transmit the communication signal from the transmitter. As a result, the conventional mobile telephone system is disadvantageous in that the selected mobile station uselessly consumes a great amount of electric power.

In view of the above, the power supplying circuit may temporarily be disabled after transmission of the specific up-loop signal. This, however, results in a reduction of an activity ratio of the radio communication channels as will later be discussed.

SUMMARY OF THE INVENTION

It is therefore an object of the present invention to provide a mobile station of a radio communication network, which is avoidable of uselessly consuming a great amount of electric power.

It is another object of this invention to provide a radio communication network, which is capable of saving electric power of a mobile station without reduction of an activity ratio of radio communication channels of the radio communication network.

Other object of this invention will become clear as the description proceeds.

According to an aspect of this invention, there is provided a mobile station which is for use in a radio communication network including a base station and includes a receiver, a transmitter, monitoring means coupled to the receiver for monitoring a down-loop indicating signal directed from the base station to the mobile station to produce a down-loop check signal, and power supplying means responsive to the down-loop check signal for supplying electric power to the transmitter. The transmitter is for transmitting a specific up-loop signal to the base station when supplied with the electric power in response to the down-loop check signal. The mobile station is characterized by deenergizing means coupled to the transmitter and the power supplying means for deenergizing the power supplying means upon completion of transmission of the specific up-loop signal, and reviving means coupled to the deenergizing means and the power supplying means for reviving the power supplying means to make the power supplying means continuously supply the electric power to the transmitter after deenergization of the power supplying means by the deenergizing means.

Preferably, the reviving means makes the power supplying means continuously supply the electric power to the transmitter after an off-hook signal is produced to make the transmitter transmit a communication signal to the base station.

According to another aspect of this invention, there is provided a mobile radio communication network including a base station and a mobile station, wherein the base station includes down-loop indicating signal producing means for producing a down-loop indicating signal, call signal producing means for producing an intermittent succession of call signals succeeding the down-loop indicating signal, and transmission means coupled to the down-loop indicating signal producing means and the call signal producing means for transmitting the down-loop indicating signal and the call signal succession towards the mobile station and wherein the mobile station includes a receiver, a transmitter, monitoring means coupled to the receiver for monitoring the down-loop indicating signal directed to the mobile station to produce a down-loop check signal, and power supplying means responsive to the down-loop check signal for supplying electric power to the transmitter, the transmitter being for transmitting a specific up-loop signal to the base station when supplied with the electric power in response to the down-loop check signal. The mobile radio communication network is characterized in that the base station comprises command signal producing means coupled to the transmission means for producing the command signal to make the transmission means transmit a command signal succeeding each of the call signals to the mobile station and that the mobile station comprises deenergizing means coupled to the transmitter and the power supplying means for deenergizing the power supplying means upon completion of transmission of the specific up-loop signal, reviving means coupled to the deenergizing means and the power supplying means for reviving the power supplying means to make the power supplying means continuously supply the electric power to the transmitter after deenergizing of the power supplying means by the deenergizing means, actuating means coupled to the monitoring means and the reviving means and responsive to the starting signal for actuating the reviving means to temporarily revive the reviving means before the reviving means makes the power supplying means continuously supply the electric power to the transmitter, and confirmation signal producing means responsive to the command signal directed to the mobile station for producing a confirmation signal, and that the base station further comprises reception means for receiving a confirmation signal to produce a reception signal, and control means coupled to the reception means and the transmission means and responsive to the reception signal for controlling transmission of the call signal succession from the transmission means.

DESCRIPTION OF THE PREFERRED EMBODIMENT

Figure 1:
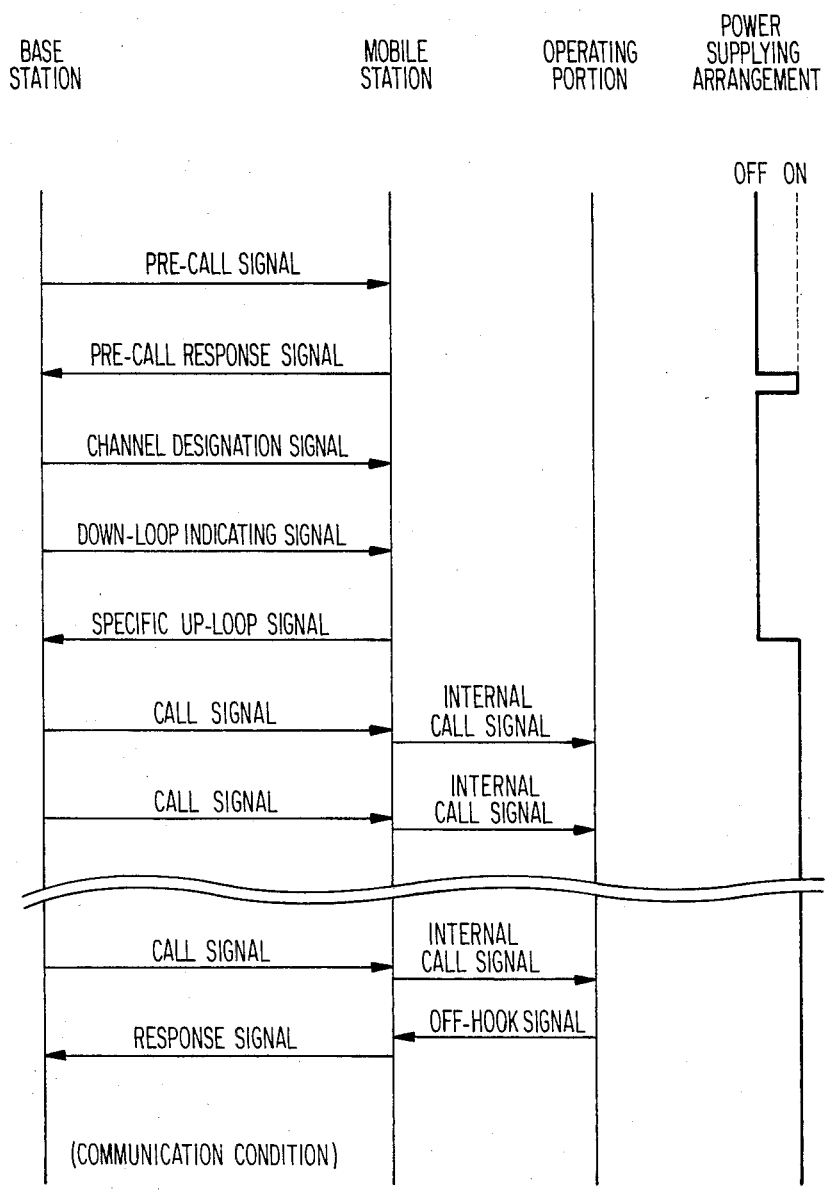
FIG. 1 is a flow chart for use in describing operation of a conventional mobile telephone system.

Referring to FIG. 1, operation of a conventional mobile telephone system will be described at first for a better understanding of the present invention. The mobile telephone system comprises a base station and a plurality of mobile stations. In the manner known in the art, the base station is situated at a fixed location and has a service area. Such mobile station is installed in a vehicle, such as an automobile. The mobile station is for use by a subscriber who is driving the vehicle in the service area. Each mobile station comprises a receiver, a transmitter, and a power supplying arrangement. The operation will be described as regards a case wherein two of the subscribers are going to talk through the base station.

It will be assumed that one of the subscribers has already requested the base station to establish a communication channel to use of the mobile stations that is installed in a vehicle driven by the other of the subscribers and should be selected a selected station. The power supplying arrangement is depicted along a rightmost column, separately, from the mobile station merely for convenience of illustration.

The base station transmits a pre-call signal towards the selected station. When the pre-call signal is received by the receiver of the selected station, the power supplying arrangement temporarily supplies electric power from a battery to the transmitter of the selected station as depicted "on" in the figure. As a result, the transmitter transmits a pre-call response signal towards the base station in response to the pre-call signal.

After the pre-call response signal is received by the base station, a channel designation signal is transmitted from the base station towards the selected station. The channel designation signal is for designating one of radio communication channels of the mobile telephone system as a designated channel for use between the base and the selected stations. After the channel designation signal is received by the receiver of the selected station, the transmitter is made to transmit various signals to the base station through the designated channel.

The base station transmits a down-loop indicating signal to the selected station through the designated channel after transmission of the channel designation signal. In the selected station, the receiver is monitored by a mobile station control unit as regards whether or not the down-loop indicating signal is received. When the down-loop indicating signal is received by the receiver, a down-loop check signal (not shown) is produced in the mobile station control unit.

Responsive to the down-loop check signal, the power supplying arrangement supplies the electric power from the battery to the transmitter of the selected station. As a result, the transmitter is capable of transmitting a specific up-loop signal to the base station in response to the down-loop check signal. After the specific up-loop signal is transmitted towards the base station, the electric power is continuously supplied to the transmitter of the selected station until clearing operation is carried out upon completion of communication between the two subscribers.

Upon reception of the specific up-loop signal, the base station confirms that base station is coupled to the selected station through the designated channel. The base station transmits an intermittent succession of call signals towards the selected station after confirmation of establishment of the designated channel. When each call signal is received by the receiver of the selected station, an internal call signal is produced in the mobile station control unit. The internal call signal is supplied to an operating portion of the selected station and serves to produce a call sign, such as a call tone, in the operating portion. The call sign is for calling the subscriber of the selected station. The operating portion is illustrated between the "mobile station" and the "power supplying arrangement."

When off-hook operation is carried out by the subscriber in response to the call sign, the operating portion produces an off-hook signal. Responsive to the off-hook signal, the transmitter transmits a response signal towards the base station. After the response signal is received by the base station, the subscriber is communicable with another subscriber through the designated channel. When the clearing operation is carried out, the transmitter transmits a clearing signal to the base station.

The conventional mobile telephone system is disadvantageous in view of consumption of the electric power in the selected station. This is because the power supply arrangement continuously supplies the electric power to the transmitter after transmission of the specific up-loop signal until completion of the communication even when the call sign is produced in the operating portion.

In view of the above, the power supplying arrangement may temporarily be disabled after transmission of the specific up-loop signal. However, judgement becomes impossible by the base station about whether or not the base station is coupled to the selected station through the designated channel. This is because the transmitter of the selected station can not be driven. Therefore, the designated channel must be continuously insured during a certain time internal in the base station after start of transmission of the call signal succession even if the clearing operation is carried out by the subscriber. This results in reduction of an activity ratio of the radio communication channels.

Figure 2:
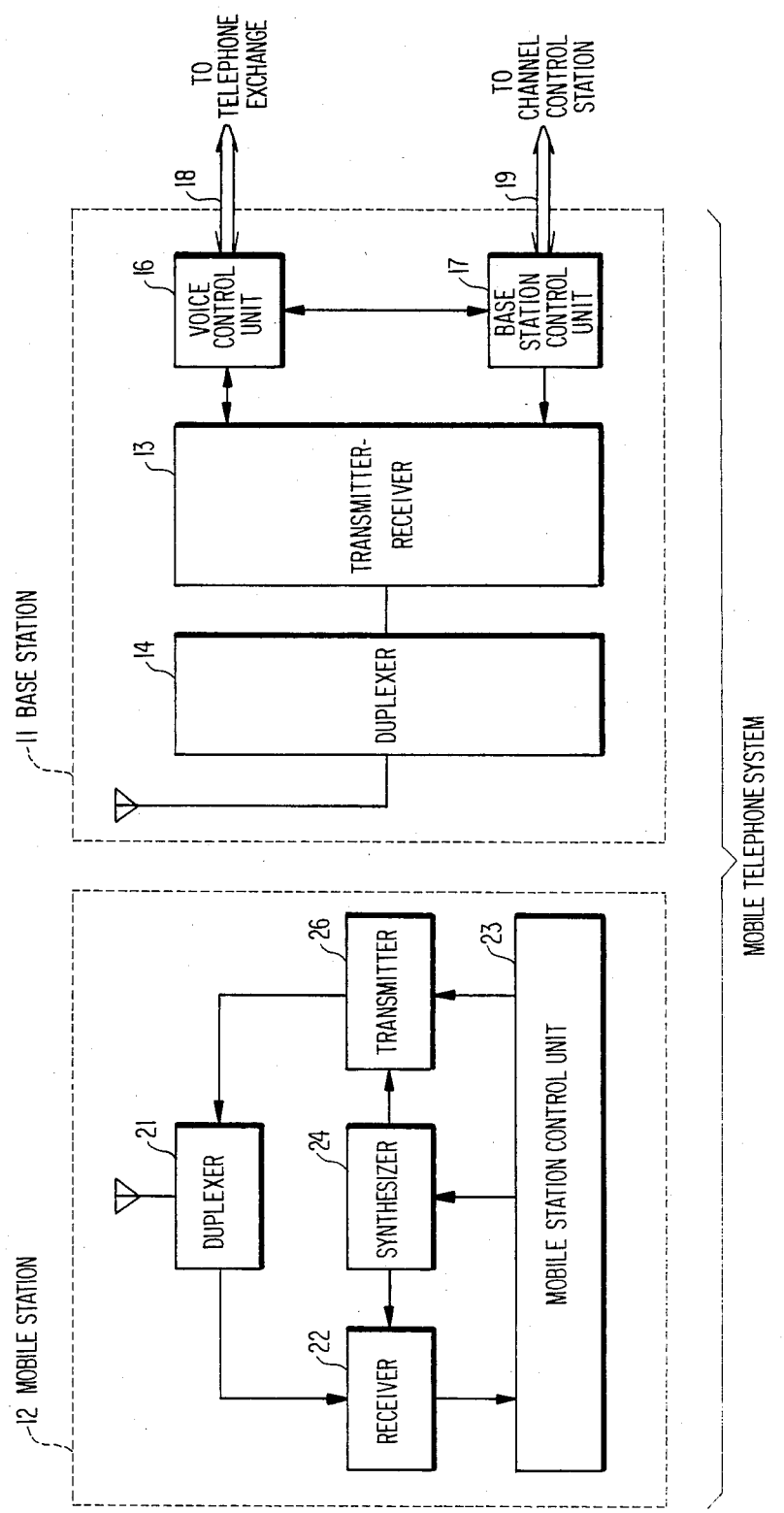
FIG. 2 is a block diagram of a mobile telephone system according to an embodiment of this invention.

Referring to FIG. 2, description is made in relation to a mobile telephone system according to an embodiment of the present invention. The mobile telephone system comprises a base station 11 and a plurality of mobile stations. One of the mobile stations is depicted and designated by a reference numeral 12. In the manner described in conjunction with FIG. 1, it will be assumed that another (not shown) of the mobile stations is requesting the base station 11 to establish a communication channel to the mobile station 12 through the base stations 11 through a selected one of radio communication channels of the mobile telephone system. For this purpose, the base station 11 selects the mobile station 12 as a selected station.

The base station 11 comprises a transmitter-receiver 13 and a duplexer 14. The transmitter-receiver 13 is for transmitting a communication down-signal to the selected station 12 through the duplexer 14 and receiving a communication up-signal from the selected station 12 through the duplexer 14. Each of the communication down-signal and the communication up-signal is sent as a radio frequency signal through the selected radio communication channel between the base and the selected stations 11 and 12.

The base station 11 further comprises a voice control unit 16 and a base station control unit 17 which are coupled to the transmitter-receiver 13. The voice control unit 16 is coupled to a mobile telephone exchange (not shown) through a voice channel 18 and serves to produce the down-loop indicating signal and the call signal succession which are described referring to FIG. 1. The base station control unit 17 is coupled to a channel control station (not shown) through a control channel 19 and serves to produce the pre-call signal and the channel designation signal which are described referring to FIG. 1. Each of the voice and the base station control channels 18 and 19 is of a wired circuit and/or a radio circuit. In addition, the voice and the base station control units 16 and 17 are operatively coupled to one another.

In the manner exemplified in the selected station 12, each mobile station comprises a duplexer 21, a receiver 22, a mobile station control unit 23, a synthesizer 24, and a transmitter 26 as will be described in the following. The receiver 22 is for receiving the communication down-signal from the base station 11 through the duplexer 21 to produce a reception signal. Responsive to the reception signal, the mobile station control unit 23 produces a first and a second internal signal. Supplied with the first internal signal, the synthesizer 24 produces a first and a second synthesized signal. The first synthesized signal is supplied to the receiver 22 in the manner known in the art. Responsive to the second internal signal and the second synthesized signal, the transmitter 26 transmits the communication up-signal to the base station 11 through the duplexer 21.

Figure 3:
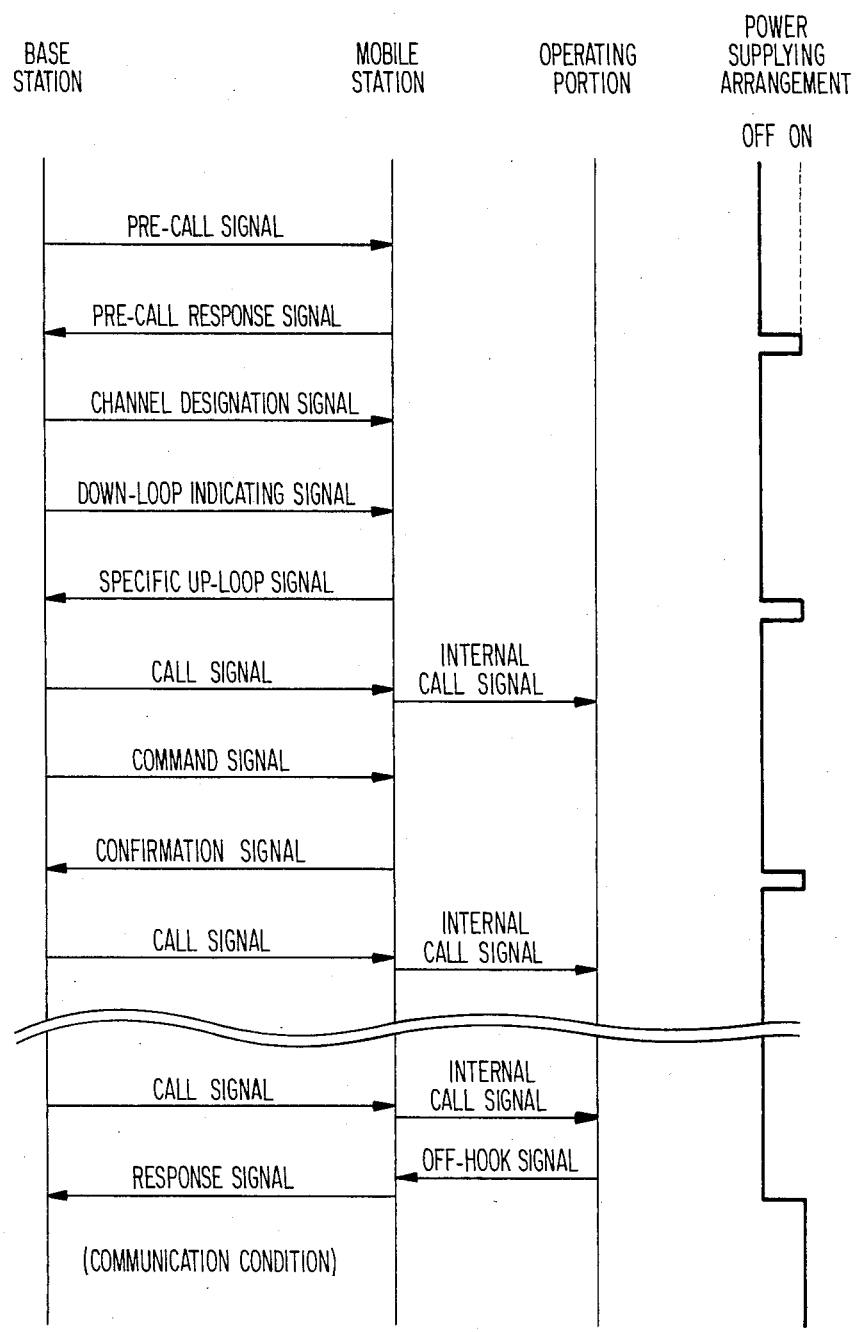
FIG. 3 is a flow chart for use in describing operation of the mobile telephone system shown in FIG. 2.

Referring to FIG. 3 in addition to FIG. 2, description will be made in relation to operation of the mobile telephone system shown in FIG. 2. For convenience, description will be omitted about partial operation from transmission of the pre-call signal till transmission of the down-loop indicating signal because the partial operation is also carried out in the conventional mobile telephone described referring to FIG. 1.

The down-loop indicating signal is received by the receiver 22 through the duplexer 21. Responsive to the down-loop indicating signal, the receiver 22 produces a monitoring signal as the reception signal. The monitoring signal is supplied to the mobile station control unit 23. As a result, the receiver 22 is monitored by the mobile station control unit 23 about whether or not it receives the down-loop indicating signal. Responsive to the monitoring signal, the mobile station control unit 23 produces the down-loop check signal which is supplied to the power supplying arrangement. In this event, the mobile station control unit 23 is herein referred to as a monitoring arrangement. The power supplying arrangement is indicated on the rightmost end of FIG. 3.

Responsive to the down-loop check signal, the power supplying arrangement supplies the electric power from the battery to the transmitter 26. As a result, the transmitter 26 is capable of transmitting the specific up-loop signal as the communication up-signal to the base station 11 in response to the down-loop check signal.

The mobile station control unit 23 serves to stop supplying of the electric power to the transmitter 26 after completion of transmission of the specific up-loop signal towards the base station 11 and may be referred to herein as a deenergizing arrangement.

When the specific up-loop signal is received by the base station 11, it is confirmed the base station 11 is coupled to the selected station 12 through the designated channel. The base station 11 transmits the call signal succession towards the selected station 12 after confirmation of establishment of the designated channel in the manner known in the art. The call signals are produced in the voice control unit 16 and have a time interval of, for example, one second between two successive ones of the call signals. In this event, the voice control unit 16 will be referred to as a call signal producing arrangement.

When each of call signals is received by the receiver 22, the internal call signal is produced in the mobile station control unit 23. The internal call signal is supplied to an operating portion of the selected station 11 and serves to produce the call sign, such as the call tone, in the operating portion in the manner known in the art. The call signal is for calling the subscriber. Like in FIG. 1, the operating portion is described in FIG. 3.

After the base station 11 transmits each call signal, it transmits a command signal as the communication down-signal to the selected station 12. The command signal is produced in the voice control unit 16. Therefore, the voice control unit 16 will be referred to as a command signal producing arrangement. In practice, each command signal is produced between two successive ones of the call signals.

The command signal is received by the receiver 22 through the duplexer 21. Responsive to the command signal, the receiver 22 produces an internal command signal as the reception signal. The internal command signal is supplied to the mobile station control unit 23. As a result, the receiver 22 is monitored by the mobile station control unit 23 about whether or not it receives the command signal. Responsive to the internal command signal, the mobile station control unit 23 produces a starting signal. In this event, the mobile station control unit may therefore be referred to as the monitoring arrangement.

Responsive to the starting signal, the power supplying arrangement temporarily supplies the electric power from the battery to the transmitter 26. It is to be noted here supply of the electric power is completed in a short time. In this event, the selected station control unit 23 serves to revive the power supplying arrangement and may therefore be referred to here as a reviving arrangement. In addition, the selected station control unit 23 serves to actuate the reviving arrangement and may therefore be referred to here as an actuating arrangement.

When the transmitter 26 is supplied with the electric power, it transmits a confirmation signal as the communication up-signal to the base station 11 in response to the command signal. It is to be noted here the confirmation signal lasts only a short time. In this event, the mobile station control unit 23 serves to produce the confirmation signal and may therefore be referred to here as the confirmation signal producing arrangement.

The confirmation signal is received by the transmitter-receiver 13 through the duplexer 12. Responsive to the confirmation signal, the transmitter-receiver 13 produces a reception signal. The reception signal is supplied to the voice control unit 16. Detection operation is carried out about whether or not the reception signal is supplied to the voice control unit 16 in response to each call signal. As will become clear in the following, the voice control unit 16 controls supply of the call signal succession to the transmitter-receiver 13 whenever reception of the reception signal is detected.

For example, the voice control unit 16 stops transmission of the call signal when the reception signal is not detected in spite of transmission of the call signals of, for example, ten times. According to the example, the designated channel is rendered busy during only ten seconds. If the designated channel were busy during a long interval of time, the radio communication channels of the mobile radio communication network would have a very poor activity ratio. In contrast, it will now be appreciated that the radio communication channels have an astonishingly excellent activity ratio.

When off-hook operation is carried out by the subscriber in response to the call sign, the above-described operating portion produces the off-hook signal. Therefore, the operating portion will be referred to herein as an off-hook signal producing arrangement. Responsive to the off-hook signal, the actuating arrangement actuates the reviving arrangement to revive the power supplying arrangement in the manner which is described earlier in detail. In response, the electric power is supplied to the transmitter 26. Therefore, the response signal is transmitted from the transmitter 26 to the base station 11 through the duplexer 21 as the transmission up-signal.

After the response signal is received by the base station 11, the subscriber is communicable with the calling subscriber through designated channel. The electric power is continuously supplied to the transmitter 26 until the clearing operation is carried out upon completion of communication between the subscribers. When the clearing operation is carried out, the transmitter 26 transmits the clearing signal to the base station 11.

While the present invention has thus far been described in connection with the mobile telephone system, it will now readily be applicable to a mobile radio communication network of the other kind.

What is claimed is:

1. A mobile station for use in a radio communication network including a base station, said mobile station including a receiver, a transmitter, monitoring means coupled to said receiver for monitoring a down-loop indicating signal directed from said base station to said mobile station to produce a down-loop check signal, and power supplying means responsive to said down-loop check signal for supplying electric power to said transmitter, said transmitter being for transmitting a specific up-loop signal to said base station when supplied with said electric power in response to said down-loop check signal, wherein the improvement comprises:

deenergizing means coupled to said transmitter and said power supplying means for deenergizing said power supplying means upon completion of transmission of said specific up-loop signal; and reviving means coupled to said deenergizing means and said power supplying means for reviving said power supplying means to make said power supplying means continuously supply said electric power to said transmitter after deenergization of said power supplying means by said deenergizing means.

2. A mobile station as claimed in claim 1, further comprising off-hook signal producing means for producing an off-hook signal, wherein said mobile station further comprises actuating means coupled to said off-hook signal producing means and said reviving means and responsive to said off-hook signal for actuating said reviving means to revive said power supplying means.

3. A mobile station as claimed in claim 1, wherein said monitoring means is further coupled to said deenergizing means for further monitoring a command signal directed from said base station to said mobile station after deenergization of said power supplying means by deenergizing means to produce a starting signal;

said mobile station further comprising additional actuating means coupled to said monitoring means and said reviving means and responsive to said starting signal for actuating said reviving means to temporarily revive said reviving means before said reviving means makes said power supplying means continuously supply said electric power to said transmitter.

4. In a mobile radio communication network including a base station and a mobile station, said base station including down-loop indicating signal producing means for producing a down-loop indicating signal, call signal producing means for producing an intermittent succession of call signals succeeding said down-loop indicating signal, and transmission means coupled to said down-loop indicating signal producing means and said call signal producing means for transmitting said down-loop indicating signal and said call signal succession towards said mobile station, said mobile station including a receiver, a transmitter, monitoring means coupled to said receiver for monitoring the down-loop indicating signal directed to said mobile station to produce a down-loop check signal, and power supplying means responsive to said down-loop check signal for supplying electric power to said transmitter, said transmitter being for transmitting a specific up-loop signal to said base station when supplied with said electric power in response to said down-loop check signal, the improvement wherein:

said base station comprises command signal producing means coupled to said transmission means for producing said command signal to make said transmission means transmit a command signal succeeding each of said call signals to said mobile station;

said mobile station comprising:

deenergizing means coupled to said transmitter and said power supplying means for deenergizing said power supplying means upon completion of transmission of said specific up-loop signal;

reviving means coupled to said deenergizing means and said power supplying means for reviving said power supplying means to make said power supplying means continuously supply said electric power to said transmitter after deenergizing of said power supplying means by said deenergizing means;

actuating means coupled to said monitoring means and said reviving means and responsive to said starting signal for actuating said reviving means to temporarily revive said reviving means before said reviving means makes said power supplying means continuously supply said electric power to said transmitter; and confirmation signal producing means responsive to the command signal directed to said mobile station for producing a confirmation signal;

said base station further comprising:

reception means for receiving a confirmation signal to produce a reception signal; and control means coupled to said reception means and said transmission means and responsive to said reception signal for controlling transmission of said call signal succession from said transmission means.

* * * * *

UNITED STATES PATENT AND TRADEMARK OFFICE
CERTIFICATE OF CORRECTION

PATENT NO. : 4,723,304

DATED : February 2, 1988

INVENTOR(S) : MAEDA

It is certified that error appears in the above-identified patent and that said Letters Patent is hereby corrected as shown below:

Column 6, line 28, delete "internal call signal" and insert --internal call sign--.

Signed and Sealed this

Twenty-ninth Day of November, 1988

Attest:

DONALD J. QUIGG

*Attesting Officer*      *Commissioner of Patents and Trademarks*